B. D. Morrell,
Washing Machine,
Nº 20,574. Patented June 15, 1858.
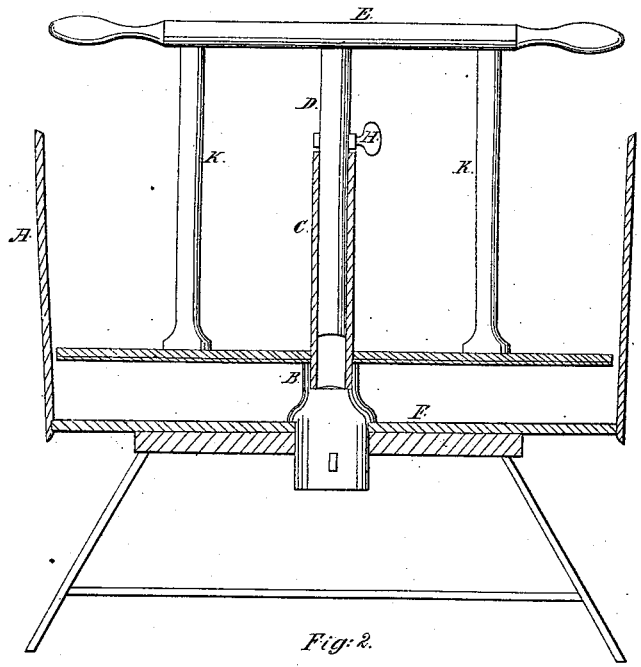
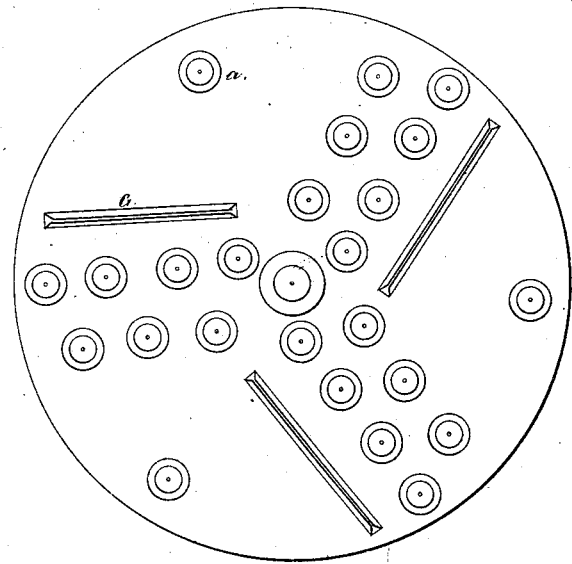

UNITED STATES PATENT OFFICE.

BENJAMIN D. MORRELL, OF WINDHAM, MAINE.

WASHING-MACHINE.

Specification of Letters Patent No. 20,574, dated June 15, 1858.

*To all whom it may concern:*

Be it known that I, B. D. MORRELL, of Windham, in the county of Cumberland and State of Maine, have invented a new and useful Improvement in Washing-Machines; and I do hereby declare that the following is a full, clear, and exact description of the same, reference being had to the accompanying drawings, forming a part of this specification, in which—

Figure 1, is a vertical central section of a washing machine constructed with my improvements. Fig. 2, is an inverted plan of the rubbing disk.

Similar letters of reference in each of the several figures indicate corresponding parts.

My invention consists simply in the combination with a detachable metallic socket and vertical metallic spindle of an adjusting screw collar which is fitted to slide up and down over the spindle. By this arrangement the rubbing board can be adjusted, or raised or lowered more or less, so as to suit the quantity and quality or texture of the clothes to be washed, and thus either the direct action of the rubber upon the clothes or simply the motion given to the water by the circular vibration of said rubber can be employed for removing the dirt from the clothes. The socket and all the attachments of the machine can also be removed from the tub and the tub used as a common wash tub.

To enable others, skilled in the art to make and use my invention, I will proceed to describe its construction and operation.

A, represents the tub; B, a hollow metal step fitted water tight into the bottom of the same and furnished with a let off cock at $a$.

C, is a metallic socket set into the step B, so as to be capable of being readily removed and still not revolve with the spindle and rubber.

D′, is the rubber made with a rubbing surface of the most approved character as shown. This rubber is fitted loosely over the upwardly projecting socket by means of a hole $b$, in its center, being guided by said socket in its up and down movements, and also adjusted up and down over the same, as presently described. K, K, are two uprights projecting up from the top of the rubber and fastening into a handle or cross head E, as shown.

D, is a central guide spindle projecting down from the handle E, and entering snugly, but loosely, into the socket C, as shown. This spindle serves as an axis for the rubber to vibrate upon horizontally.

G, is a collar fitted loosely on the spindle intermediate between the handle E, and socket C. This collar can be raised or lowered on the spindle and confined in any desired place by means of a set screw H, as shown.

By lowering the collar G, H, from $y$ to $x$, the rubber will be caused to stand higher above the tub bottom than it is shown to stand in the drawing, and by raising the collar from $y$ to $z$, the rubber will occupy a place near the bottom of the tub.

When the rubber is lowered it exerts friction to bind upon the clothes sufficiently to cleanse very heavy articles when it is raised so as not to bind upon the clothes it effects the cleaning of light goods by simply agitating the water.

While working the machine the rubber is supported by the adjusting collar and as the rubber is guided vertically by the spindle and horizontally by the collar all binding is prevented and consequently the only laborious occupation is the rotation of the spindle.

I do not claim holding the rubber down by a spring and adjusting collar, nor do I claim a socket arranged below the bottom of the tub, but What I do claim as my invention and desire to secure by Letters Patent, is—

The fitting and adjusting up and down of the rubber D′, over and within a hollow detachable metallic socket C, projecting up from the bottom of the tub by means of a central hole $b$, a revolving spindle D, and sliding collar G, H, arranged precisely as herein specified and shown.

B. D. MORRELL.

Witnesses:
 ISAIAH H. BAKER,
 ALGERNON L. COLE.